United States Patent [19]

Lu et al.

[11] 4,187,094

[45] Feb. 5, 1980

[54] METHOD FOR IMPROVING THE DURABILITY OF SPONTANEOUS NAF OPAL GLASSWARE

[75] Inventors: Kun-Er Lu; Walter H. Tarcza, both of Painted Post, N.Y.

[73] Assignee: Corning Glass Works, Corning, N.Y.

[21] Appl. No.: 903,537

[22] Filed: May 8, 1978

[51] Int. Cl.$^2$ .................... C03C 15/00; C04B 35/00
[52] U.S. Cl. .................... 65/30 R; 65/30 E; 65/DIG. 14; 65/31; 106/73.1; 106/54
[58] Field of Search ............ 65/30 R, 31, DIG. 14, 65/30 E; 106/73.1, 54

[56] References Cited

U.S. PATENT DOCUMENTS

| | | | |
|---|---|---|---|
| 2,261,691 | 11/1941 | Lyle et al. | 65/30 R |
| 2,464,851 | 3/1949 | Davis | 65/30 R |
| 3,451,796 | 6/1969 | Mochel | 65/31 |
| 3,653,864 | 4/1972 | Rothermel et al. | 65/31 X |
| 3,948,629 | 4/1976 | Bartholomew et al. | 65/30 R |
| 4,019,884 | 4/1977 | Elmer et al. | 65/30 R |
| 4,026,692 | 5/1977 | Bartholomew | 65/30 R |
| 4,038,448 | 7/1977 | Boyd et al. | 65/30 R X |
| 4,080,188 | 3/1978 | Doddato et al. | 65/30 R X |
| 4,086,074 | 4/1978 | Minot et al. | 65/31 |
| 4,107,388 | 8/1978 | Gambaretto et al. | 65/31 X |

*Primary Examiner*—S. Leon Bashore
*Assistant Examiner*—Frank W. Miga
*Attorney, Agent, or Firm*—Kees van der Sterre; Clinton S. Janes, Jr.

[57] ABSTRACT

Spontaneous sodium fluoride opal glassware is treated to improve surface durability against aqueous attack by controlled sodium depletion and subsequent heat consolidation of the glass surface. The method comprises extracting surface sodium ions using water or dilute aqueous acidic solutions and subsequently consolidating by heat the surface to produce a glossy surface without any migration of sodium ions.

5 Claims, No Drawings

METHOD FOR IMPROVING THE DURABILITY OF SPONTANEOUS NAF OPAL GLASSWARE

BACKGROUND OF THE INVENTION

The present invention relates to glassware formed from spontaneous NaF opal glasses, and is particularly concerned with the treatment of such glassware to improve the surface durability thereof.

In the prior art, a number of different techniques have been developed to improve the surface durability of clear glasses, such as the so-called soda lime glasses, which are the $Na_2O$-$CaO$-$SiO_2$ glasses widely used for the manufacture of glass containers. One of the oldest methods involves the treatment of the container with sulfur or a sulfur oxide gas, as shown, for example, by U.S. Pat. No. 1,933,529 to Wardley et al. A survey of such methods is provided by Coward and Turner, J. Soc. Glass Tech., 22, 309–319 (1938).

Other processes which have been proposed for improving the durability of glass containers by the treatment of hot glassware include treatment with halogen-substituted hydrocarbons (U.S. Pat. No. 2,261,689 to Lyle et al.), treatment with hot, dry air (U.S. Pat. No. 3,215,515 to Bacon), treatment with fluorine-containing substances (U.S. Pat. No. 3,314,772 to Poole et al.) and treatment by ion-exchange with kaolinitic clays (*Surface Dealkalization of Finished Glassware*, H. S. Williams and W. A. Weyl, *The Glass Industry*, 26, 6, 275–301 (1945). A method for treating alkali silicate glasses by sequential exposure to concentrated sulfuric acid and heat is described by le Clerc et al. in U.S. Pat. No. 3,116,991.

A spontaneous sodium fluoride opal glass is a glass which spontaneously transforms from a clear state to an opalized state upon cooling from a melt, wherein sodium fluoride crystals are deemed to constitute the principal opacifying phase. Glasses of this type have recently been considered for tableware and related applications because of the dense, white opacity exhibited thereby. U.S. Pat. Nos. 4,038,448 and 4,080,215 to Boyd et al. disclose examples of spontaneous sodium fluoride opal glasses of sodium aluminosilicate composition intended for such applications, wherein NaF crystals are deemed to constitute the principal opacifying phase. In the glasses of the latter patent, $SrF_2$ crystals may also be present.

Spontaneous sodium aluminosilicate opal glasses such as above described, comprising NaF crystals as the principal opacifying phase, exhibit reasonably good chemical durability in bulk; however, the surface layer which is formed on glass articles molded from such glass compositions exhibits relatively poor durability. This behavior is presently attributed in part to the presence in the surface layer of excess $Na_2O$, termed extractable $Na_2O$ because it is subject to removal from the surface layer by water or aqueous acidic solutions in much the same way that sodium can be removed from soda lime glasses by appropriate treatment.

The relatively poor durability exhibited by spontaneous NaF opal glasses gives rise to several problems in use, among which are weathering and surface chalking or crazing. Weathering is a reaction between sodium in the glass surface and moisture and $CO_2$ in the atmosphere. Surface chalking and crazing are due to cracking or spalling of a hydrated surface layer of glass from the article, usually on a microscopic scale, and can be induced in these glasses by the sequential washing and heating of the glassware in use, for example, by ordinary dishwashing and baking procedures.

The susceptibility of opal glassware to this type of behavior is dependent upon both the composition of the glass and the thermal history of the glass article. However, it is very difficult to control both composition and thermal history for the purpose of improving chemical durability, while at the same time retaining the physical properties necessary for the production of dense, white opal tableware.

It is a principal object of the present invention to provide spontaneous opal glassware comprising NaF as the principal opacifying phase which exhibits substantially improved resistance to surface attack by aqueous media while retaining excellent surface quality and the dense white opacity characteristic of such ware.

It is a further object of the invention to provide a method for surface-treating spontaneous sodium fluoride opal glassware to impart substantially improved resistance to surface attack by aqueous media thereto.

Other objects and advantages of the invention will become apparent from the following description thereof.

SUMMARY OF THE INVENTION

In accordance with the present invention, a simple method for improving the durability of spontaneous sodium fluoride opal glassware, particularly against surface attack by water, is provided. That method broadly comprises, first, briefly exposing an opal glass article to a weak $Na_2O$-extracting medium, such as hot water, for a time sufficient to form a $Na_2O$-depleted surface layer thereon. Thereafter, the glass article is heated to a temperature in the range of about 200°–500°C. for a time sufficient to consolidate the $Na_2O$-depleted layer.

Opal glassware suitably treated in accordance with this method includes glassware formed of spontaneous opal glasses wherein NaF constitutes the principal opacifying phase. Such glasses are known in the art, typically comprising, in weight percent, about 8–13% $Na_2O$, 5–9% $Al_2O_3$, 71–78% $SiO_2$ and 3–6% F. In addition the glass may include optional constituents such as $K_2O$, $Li_2O$, CaO, BaO, SrO, $B_2O_3$ and the like to modify the melting, forming, opalizing and other properites of the glass, as desired. However, the total of all such additions will normally be held to a level not exceeding about 10% by weight.

The effectiveness of the method of the invention in improving the durability of sodium fluoride opal glassware depends upon controlling the extent of soda removal from the surface of the treated glass article; limited-duration treatments and weak $Na_2O$-extracting media are used in order to avoid the complete removal of all extractable $Na_2O$ from the surfaces of the article. If too much soda is removed, microcracking of the surface of the glass article will occur during the heating step of the durability-enhancing procedure. On the other hand, insufficient removal of soda renders the article subject to surface attack in later use.

While the mechanism of the method of the invention is not yet fully understood, it is presently believed that the step of exposing the glass to a hot aqueous medium operates to hydrate a surface layer on the glass, probably by ion-exchange of $Na^+$ for $H_3O^+$ ions, while the subsequent step of heating the glass operates to consolidate this hydrated $Na_2O$-depleted layer, providing a relatively water-resistant surface. In any event, the resistance of the treated surface to subsequent attack by water in the atmosphere or in washing solutions is considerably improved by the treatment.

DETAILED DESCRIPTION

As previously noted, a central feature of the method of the present invention is that of limiting the extent of removal of surface $Na_2O$ from the glass. Spontaneous sodium fluoride opal glasses of the kind proposed for use as tableware contain large quantities of extractable $Na_2O$, but the extraction of all of this compound from the surfaces of the glass article does not provide a satisfactory solution to the durability problem. It is found that the surface layer remaining on the glass after total extraction of $Na_2O$ is subject to microcracking and spalling on heating, giving the appearance of surface chalking and/or leaving a matte rather than a glossy surface on the article.

Prior art methods for the dealkalization of glass surfaces are largely designed for use with clear glasses, such as the so-called lime glasses or borosilicate glasses, which typically have better surface durability than the sodium fluoride opal glasses. Many of these prior art methods are inconvenient to use, and some may be difficult to control where only limited amounts of surface $Na_2O$ are to be extracted from the glass.

We have found that control over the extent of $Na_2O$ removal can best be accomplished through the use of a relatively weak $Na_2O$-extracting medium, such as water or another highly aqueous medium comprising water in substantial proportion. The rate of soda removal by such media is slow, so that by appropriately limiting the duration of treatment, only limited amounts of extractable $Na_2O$ are removed from the surface of the opal glass.

While any medium comprising water can be used, a medium consisting essentially of water alone is normally preferred from the standpoint of cost and flexibility of control. Examples of other aqueous media which are particularly effective are dilute aqueous acidic solutions. By dilute aqueous acidic solutions is meant solutions composed of water and organic or inorganic acids in concentrations not exceeding about 0.5% by weight.

The extent of soda removal from the surfaces of sodium aluminosilicate opal glasses of the kind hereinabove described is both time and temperature dependent, with higher temperatures acting to increase the rate of alkali removal, and vice versa. We prefer treatments comprising exposure of the glass to aqueous treating media which have been heated to temperatures in the range of about 50°–100°C., so that extraction can be accomplished in a relatively brief period of time. Treatment times at these temperatures typically range from about ¼–15 minute, with shorter treatments being utilized at higher temperatures, or in case acidic solutions are employed. Of course, it is also possible to carry out the treatment at lower temperatures, e.g., temperatures below 50° C., for longer times, or at higher temperatures, for example, by autoclave treatments at superatmospheric pressures. However, in the case of higher temperature treatments, caution must be exercised to insure that excessive amounts of $Na_2O$ are not extracted from the surfaces of the glass.

A simple test for determining whether any particular soda removal treatment is too severe for use with an opal glass article of a specific configuration or composition is to subject the article to a selected treatment and thereafter to heat the article to a temperature of about 300°C. for about 15 minutes. If the soda removal treatment which has been employed is too severe for the particular glass article, a microcracked or crazed surface will appear on the article following the heating step. This would indicate that a soda removal procedure involving shorter times or lower temperatures should then be used with that particular article.

The product of the $Na_2O$ extraction procedure hereinabove described is an opal glass article comprising a surface layer which has been depleted in $Na_2O$, and also perhaps hydrated to a limited degree. This $Na_2O$-depleted surface layer does not, however, exhibit improved resistance to weathering and/or surface chalking, so that further treatment of the glass article is required.

The step which has been found to be essential in imparting improved surface durability to sodium fluoride opal glasses of the kind described is a heat treating step comprising exposure of the glass to temperatures which are sufficient to dehydrate and consolidate the $Na_2O$-depleted surface layer. This heat treatment should be at a temperature at least sufficient to effect consolidation of the surface layer, but insufficient to permit the migration of additional $Na_2O$ from the interior of the glass article to the surfaces thereof.

We prefer to employ heat treatment comprising exposure of the glass article to temperatures in the range of about 200°–500°C. for times in the range of about 1–60 minutes. Such treatments have been found to provide substantial improvements in glass surface durability without giving rise to difficulties relating to the migration of additional $Na_2O$ to the surfaces of the article. Since both surface layer consolidation and $Na_2O$ migration are believed to be time and temperature dependent, shorter treatment times are preferred for use at the higher treatment temperatures, and vice versa. Of course the optimum heat treatment conditions for use with any particular glass article, depending upon the initial sodium removal procedure employed, are readily determined by routine experiment.

The invention may be further understood by reference to the following illustrative examples.

EXAMPLE I

Two spontaneous sodium fluoride opal glass articles, consisting of pressed 6¾-inch bread and butter plates composed of a glass having a composition, in parts by weight as calculated from the batch, of about 73.6 parts $SiO_2$, 6.9 parts $Al_2O_3$, 9.0 parts $Na_2O$, 1.4 parts $K_2O$, 3.8 parts SrO, 0.8 parts CaO, 1.6 parts $B_2O_3$ and 5.0 parts F are provided for treatment. Pressed glass plates of this configuration and composition exhibit dense white opacity and excellent surface gloss. However when one of these plates is subjected to a 6-hour exposure to boiling water, simulating repeated washing of the plate, followed by a 15-minute heat treatment at 300°C. to simulate oven baking, microscopically visible surface microcracking and some loss of surface gloss are observed to result.

In order to obtain improvements in surface durability against attack by water, the other plate is subjected to a durability improvement treatment comprising an initial immersion in boiling water for 5 minutes to achieve limited extraction of $Na_2O$ from the surface layer of the plate. Thereafter, the plate is placed in a lehr operating at 300°C. for approximately 10 minutes to consolidate the $Na_2O$-depleted surface layer thereon.

The treated plate is thereafter tested for surface durability in the same manner as the first plate, by immersion in boiling water for 6 hours followed by heating in lehr at 300°C. for 15 minutes. The article is then removed from the lehr and examined, and found to retain good surface gloss. Microscopic examination of the surfaces of the article at 30× magnification reveals no significant surface microcracking thereon.

EXAMPLE II

A pressed 6¾-inch bread and butter plate having the configuration and composition of the plate described above in Example I is treated to improve the surface durability thereof by a process comprising the initial step of exposing the plate to boiling acidified water (water to which $HNO_3$ had been added dropwise until a pH of about 4 was obtained) for an interval for two minutes. The plate is then removed from the boiling solution and placed in a lehr operating at 300° C. for an interval of 10 minutes.

After removal from the lehr, the plate is tested for surface durability against aqueous attack as in Example I above, by immersing the plate in boiling water for 6 hours, followed by heat treating at 300°C. for 15 minutes. Microscopic examination of the test plate discloses no evidence of surface microcracking or spalling of surface glass.

EXAMPLE III

Two spontaneous sodium fluoride opal glass articles, consisting of pressed 9-inch dinner plates composed of a glass having an approximate composition, in parts by weight as calculated from the batch, of about 77.0 parts $SiO_2$, 6.3 parts $Al_2O_3$, 11.3 parts $Na_2O$, 1.2 parts $K_2O$, 4.0 parts F and 0.2 parts $As_2O_3$, are selected for treatment. These plates exhibit dense white opacity and good surface gloss, but demonstrate relatively poor resistance to surface weathering.

In accordance with an accelerated weathering test, one of the plates is placed in a weathering cabinet operating at a temperature of 50°C. and a relative humidity of 98%. After an exposure interval of one day, the plate shows a visible surface deposit which is the product of the interaction between the moisture in the weathering atmosphere and $Na_2O$ present in the surface layer of the plate.

The other plate is thereafter subjected to a procedure intended to improve the surface durability thereof, wherein it is contacted with a treating medium consisting of a dilute aqueous $H_2SO_4$ solution, consisting of about 0.1% $H_2SO_4$ and the remainder water by weight, the temperature of this solution being about 95° C. and the time of contact between the solution and the plate being about 30 seconds. Thereafter the plate is briefly rinsed with water to remove any extracted $Na_2O$ present on the surface thereof, placed in a lehr for heating to a temperature of 385° C. over a heating interval of about 11 minutes, and finally cooled.

Upon removal from the lehr, the treated plate is placed in a weathering cabinet, again operating at a temperature of 50° C. and a relative humidity of 98%, and is checked periodically to determine whether any products of surface weathering appear thereon. After an exposure interval of approximately twelve weeks, no detectable accumulation of weathering products is found on any of the surfaces of the tested plate.

EXAMPLE IV

A pressed glass dinner plate having the composition and configuration of the plates described in Example III above is tested for surface durability in a hot water environment by sustained immersion in 95° C. water to simulate repeated washing, followed by heating at 250° C. for 10 minutes to simulate the baking cycle. If not treated to improve surface durability, such a plate will typically show visible surface crazing or cracking upon microscopic examination at 30× magnification when baked at 250° C. after a hot water immersion interval of one hour or less.

In order to improve surface durability, a second plate of this composition and configuration is treated in accordance with the procedure described in Example III above, comprising a 30-second exposure to a 0.1% aqueous $H_2SO_4$ solution at 95° C., followed by rinsing and heating to 385° C. over an 11 minute heating interval.

Following this treatment, the plate is tested for surface durability by immersion in 95° C. water for four hours, followed by heating at 250° C. for 10 minutes. The plate is then microscopically examined at 30× magnification for evidence of surface cracking or crazing. No such evidence is found.

From the foregoing examples, the significant improvements in surface durability against weathering and aqueous attack which are imparted to spontaneous sodium fluoride opal glasses in accordance with the present invention are evident. Of course, these examples are merely illustrative of the procedures which may be employed in carrying out the method of the present invention. Thus it will be obvious that numerous modifications and variations of these procedures may be used to attain the described improvements in surface durability within the scope of the appended claims.

We claim:

1. A method for improving the durability of a spontaneous sodium fluoride opal glass article against surface attack by water which comprises the steps of:
    (a) contacting the glass article with a $Na_2O$-extracting medium comprising water at a temperature in the range of about 50°–100° C. for a time sufficient to deplete the $Na_2O$ content of the surface layer but insufficient to remove all of the extractable $Na_2O$ therefrom; and thereafter
    (b) heating the glass article to a temperature in the range of about 200°–500° C. for a time sufficient to consolidate the $Na_2O$-depleted surface layer but insufficient to permit the migration of additional $Na_2O$ from the interior of the glass article to the surface thereof, thus to provide a surface free from microcracking and with good surface gloss.

2. A method in accordance with claim 1 wherein the sodium fluoride opal glass article is composed of a sodium aluminosilicate glass having a composition comprising in weight percent, about 71–78% $SiO_2$, 5–9% $Al_2O_3$, 8–13% $Na_2O$ and 3–6% F.

3. A method in accordance with claim 2 wherein the glass further comprises up to about 10% total of optional constituents selected from the group consisting of SrO, BaO, CaO, $B_2O_3$, $K_2O$ and $Li_2O$.

4. A method for improving the durability of a spontaneous sodium fluoride opal glass article against surface attack by water which comprises the steps of:
    (a) contacting the glass article with a $Na_2O$-extracting medium selected from the group consisting of water and dilute aqueous acidic solutions at a temperature in the range of about 50°–100° C. for a time in the range of about ¼–15 minutes; and thereafter (b) heating the glass article to a temperature in the range of about 200°–500° C. for a time in the range of about 1–60 minutes but insufficient to permit the migration of additional Na$_2$O from the interior of the glass article to the surface thereof, thus to provide a surface free from microcracking and with good surface gloss.

5. A method in accordance with claim 4 wherein the Na$_2$O-extracting medium is a dilute aqueous acidic solution composed of water and an organic or inorganic acid in a concentration of up to about 0.5% by weight.

* * * * *